United States Patent [19]

Alkasab

[11] 3,929,122
[45] Dec. 30, 1975

[54] SOLAR ENERGY COLLECTOR

[75] Inventor: Kalil A. Alkasab, Wheaton, Ill.

[73] Assignee: Universal Oil Products Company, Des Plaines, Ill.

[22] Filed: Nov. 18, 1974

[21] Appl. No.: 525,037

[52] U.S. Cl. .............................................. 126/271
[51] Int. Cl.² .......................................... F24J 3/02
[58] Field of Search ............ 126/270, 271; 237/1 A; 34/93

[56] References Cited
UNITED STATES PATENTS
2,969,788  1/1961  Newton ............................. 126/271

Primary Examiner—Kenneth W. Sprague
Assistant Examiner—James C. Yeung
Attorney, Agent, or Firm—James R. Hoatson, Jr.; Barry L. Clark; William H. Page, II

[57] ABSTRACT

The efficiency of a flat plate solar energy collector is enhanced by the addition of a series of spaced apart members arranged in a plane above the flat plate. Solar energy can pass downwardly between the spaced members to heat the flat plate and a series of fluid carrying channels positioned on it. Solar energy also heats the blackened upper absorbing surface of the spaced members and is conducted through said members to fluid carrying channels integral with their under surfaces. Concave focusing surfaces extending downwardly from and partially under said spaced members concentrate angled energy rays onto the flat plate or the channels positioned on it and serve to trap heat under said spaced members so as to reduce the amount of heat lost by outward radiation from the flat plate.

6 Claims, 2 Drawing Figures

U.S. Patent   Dec. 30, 1975   3,929,122
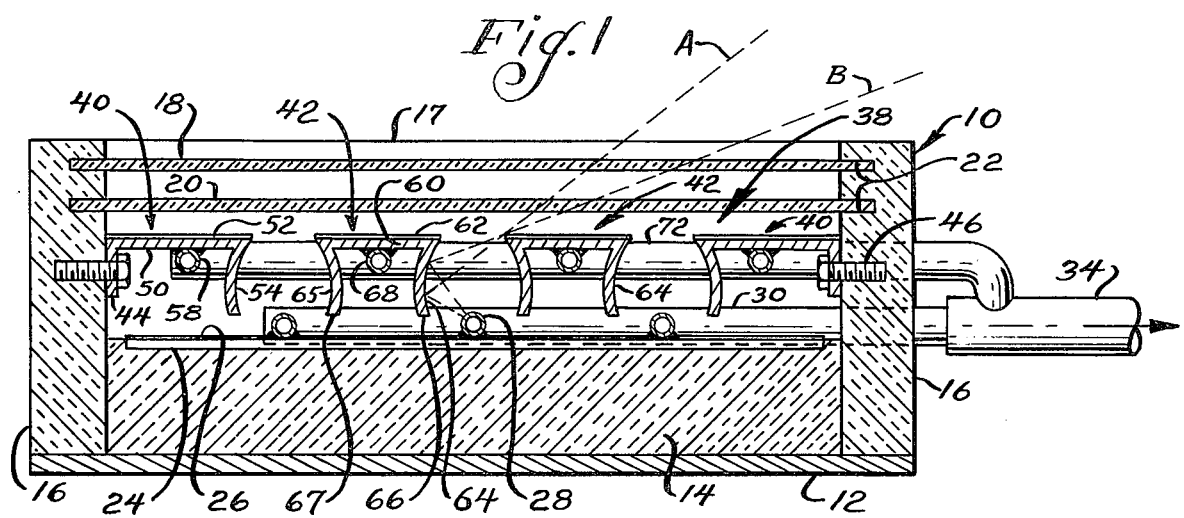
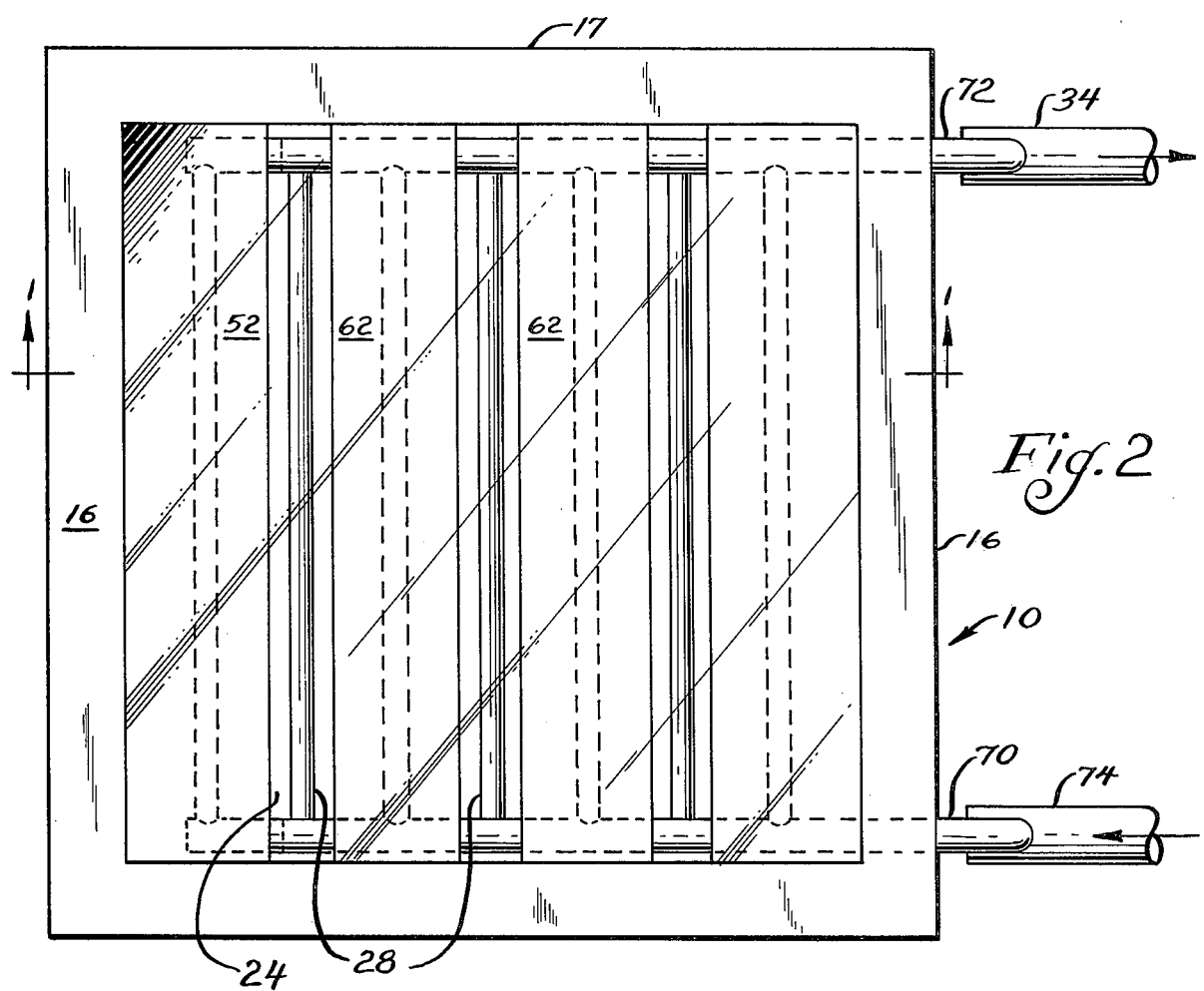

3,929,122

SOLAR ENERGY COLLECTOR

BACKGROUND OF THE INVENTION

The invention relates to solar energy collectors and particularly to the class of collectors known as flat plate collectors. Flat plate collectors normally consist of a flat metal plate mounted in an enclosed frame of insulating material which is covered by one or two layers of glass. Generally, the flat plate is painted black or otherwise coated to increase its absorbency and is provided with channels for circulating a liquid to be warmed, such as water. The channels can be brazed or soldered to the surface of the plate or formed integrally with it.

Although the aforementioned type of collector is fairly economical to build per unit of collector area, it is inefficient from the standpoint that a significant amount of solar energy reaching the flat plate is lost due to reradiation to the atmosphere. Furthermore, when the sun is low, much energy is lost since the geometry of a flat plate is not optimum. Generally, the energy incident on a flat surface varies with the cosine of the angle of the sun with the energy collected at noon being several times greater than at 8 AM or 4 PM. There are also convection and conduction losses as the air between the flat plate and glass tends to circulate between the hot plate and cooler glass.

SUMMARY OF THE INVENTION

It is among the objects of the present invention to provide an improved type of flat plate solar energy collector which will not only collect more energy per unit of collector area than conventional collectors but will do so at less cost per unit of energy collected.

The foregoing and other objects are attained by the apparatus of the present invention which comprises a single flat plate lower collector member mounted in an insulated housing covered by a pair of glass plates, and a plurality of upper collector members mounted above the lower collector but below the glass plates. The lower collector is preferably formed of a highly conductive metal such as copper or aluminum which has its upper surface painted or otherwise blackened to increase its absorbency. A series of parallel tubes are brazed or otherwise attached to the flat plate and connected at their ends to inlet and outlet manifolds to carry the heat away from the flat plate. The spacing of the tubing, the sizing of the tubing and the manifolds, and the flow rate of the fluid therein are determined in accordance with the desired temperature of the outlet fluid. Although higher flow rates result in greater total heat transfer, it is usually more desirable to control the fluid flow so as to provide fluid temperatures in the range of about 77°–93°C.

An upper absorption means comprising a plurality of extruded aluminum channel members is positioned above the flat plate. The channel members are preferably spaced from each other so as to overlie the flat plate in areas between the lower parallel tubes, thus giving solar energy rays direct access to the lower tubes. The channels have relatively wide, flat, elongated top portions which are blackened on their upper surface to improve energy absorption and which have a tube brazed or otherwise attached to their lower surface. The upper tubes are connected at their ends to manifolds similar to those used with the lower tubes. The side walls of the channels extend downwardly and inwardly and have an outwardly facing concave surface which, in one embodiment, defines an approximately 60° sector of a circle. The concave side walls are preferably left as shiny as possible since they serve to reflect and focus the solar rays on the lower tubes and flat plate. The concave side walls serve to concentrate the solar rays and increase the incident energy on the lower tubes when the sun is at low angles. The lower edges of the side walls of each channel are spaced from each other by a distance greater than the width of the tube mounted on the underside of the top surface of the channel. The aforesaid spacing of the channel side walls permits the undersides of the channel top portions to be in non-obstructed communication with portions of the underlying flat plate collector member. Thus, portions of the energy which would normally be re-radiated into space from the lower flat plate will be trapped by the channel members and utilized to heat the fluid in the channel mounted tubes. The side walls of the channels should not touch the lower flat plate so as to avoid conducting heat from the plate. However, they should be positioned quite close to it, and preferably at a distance less than the diameter of the tubes, so as to block the flow of air which takes place in a conventional flat plate collector due to convection caused by the hot lower plate and the cool upper glass. The particular spacing of the channel members and the shape and location of the concave curved surfaces can be varied to change the operational characteristics of the collector.

BRIEF DESCRIPTION OF THE DRAWINGS

FIG. 1 is an end sectional view taken on line 1—1 of FIG. 2; and

FIG. 2 is a top view of my apparatus.

DESCRIPTION OF THE PREFERRED EMBODIMENT

Referring to FIG. 1, my improved solar collector is indicated generally at 10. The collector 10 includes a base plate 12 of metal or other suitable material to which a support layer 14 of insulating material, such as rigid polystyrene or polyurethane foam, is applied. The side portions 16 and end portions 17 of the collector are also preferably formed of insulating material. A pair of glass plates 18,20 are positioned near the top of the collector in slots 22 formed in the side and end members 16,17 to further insulate and protect the collector.

Positioned on top of the insulating member 14 is a flat conductive plate 24 formed of copper, aluminum or other conductive material. The plate 24 preferably includes a coating 26 of black paint or other material which is efficient in absorbing solar energy. A plurality of tubes 28 are attached to the plate 24 such as by brazing. The tubes 28 are connected in parallel at their opposite ends to an inlet manifold (not shown) and to an outlet manifold 30 and an outlet connector member 34 for the purpose of circulating fluid such as water through the collector in order to carry away the solar energy which reaches the tubes 28 directly or by reflection, or by conduction from plate 24.

The upper absorption means indicated generally at 38 comprises generally channel-shaped extruded aluminum side members 40 and channel-shaped intermediate members 42. The side members 40 include a flat side portion 44 which may be attached to the collector side members 16 by means of fasteners 46. The side channel members 40 further include a generally flat portion 50 which is coated on its top surface with a black energy absorbent coating 52 similar to the coating 26 on the plate 24. The channel member 40 also includes a downwardly and inwardly extending concave-curved shiny side surface 54 which serves as a reflector for reflecting solar rays onto the most closely adjacent tube 28 and the portions of plate 24 near to said tube. A tube 58 attached to the lower surface of flat portion 50 such as by brazing serves to carry fluid to and from the collector in a manner similar to the lower tubes 28.

The intermediate channel members 42 include an upper flat channel portion 60 having a black coating 62 and concave side portions 64,65 similar to the corresponding portions 54 of channel member 40. The lower edges 66,67 of the side portions 64,65 respectively, are preferably positioned quite close to the flat plate 24 in order that they might serve to block a large portion of the movement of air between the flat plate 24 and glass plate 20 which would take place by convection in the absence of an obstruction such as side surfaces 64,65. In addition to blocking air movements, the side surfaces further act to trap energy radiated upwardly between edges 66,67 from flat plate 24 and permit it to be partially absorbed by the fluid passing through tube 68. The tubes 68 and 58 are attached at their ends to inlet and outlet manifolds 70,72 respectively. The manifolds 70,72 are attached to inlet and outlet connector members 74,34 which carry fluid to and from the collector 10. The connectors 74,34 are also joined to the lower inlet manifold (not shown) and the lower outlet manifold 30, respectively.

Although the improved collector 10 is probably not significantly more efficient than an ordinary flat plate reflector when the sun's rays are directly above the unit, the collector is believed to be significantly more efficient when the sun is at low angles in the early morning or late afternoon since the angled rays are reflected from side surfaces 64,65 and 54 directly onto the adjacent tubes 28 or the adjoining portions of plate 24. This is illustrated by dotted lines A and B which represent low angle solar rays which are caused to impinge directly on tube 28 by virtue of being reflected from curved surface 64.

I claim as my invention:

1. In a solar energy collector of the type having a flat energy absorbing plate mounted on an insulating base and covered by at least one transparent surface spaced above said flat plate, the energy absorbing plate having a plurality of liquid containing conduits integral with its surface for carrying heat away from said plate, the improvement comprising upper absorption means positioned beneath said at least one transparent surface and above said flat plate and in predetermined spaced relation thereto, said upper absorption means including a plurality of spaced apart, generally coplanar, upwardly facing absorption surfaces, each of said plurality of coplanar absorption surfaces having at least one outwardly concave focusing surface projecting from an edge thereof in a direction inwardly of said edge and generally downward from said coplanar absorption surface, at least one liquid carrying conduit integral with and extending downwardly from the bottom of each of said coplanar absorption surfaces, said last named conduits and at least a portion of the surfaces with which they are integral being in uninterrupted vertical communication with portions of said flat energy absorbing plate and adapted to receive radiation emanating upwardly therefrom.

2. The solar energy collector of claim 1 wherein said at least one focusing surface extends downwardly to a location spaced from said flat plate by a distance less than the outer diameter of the conduits on said flat plate.

3. The solar energy collector of claim 1 wherein said upper absorption means comprises a plurality of spaced apart channel members.

4. The solar energy collector of claim 3 wherein said channel members are formed of aluminum.

5. The solar energy collector of claim 3 wherein said flat plate and said upwardly facing absorption surfaces are coated with an energy absorbing coating.

6. The solar energy collector of claim 3 wherein said at least one focusing surface is sufficiently shiny to reflect solar rays downwardly.

* * * * *